Dec. 27, 1932.  E. W. KELLOGG  1,892,554
FILM SUPPORTING AND DRIVING APPARATUS
Filed July 27, 1928
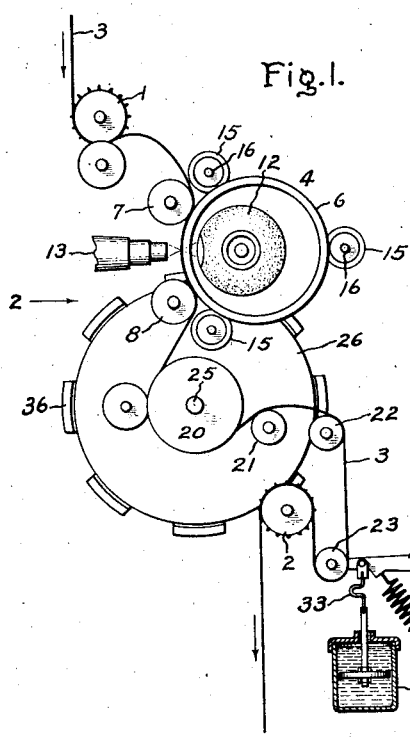
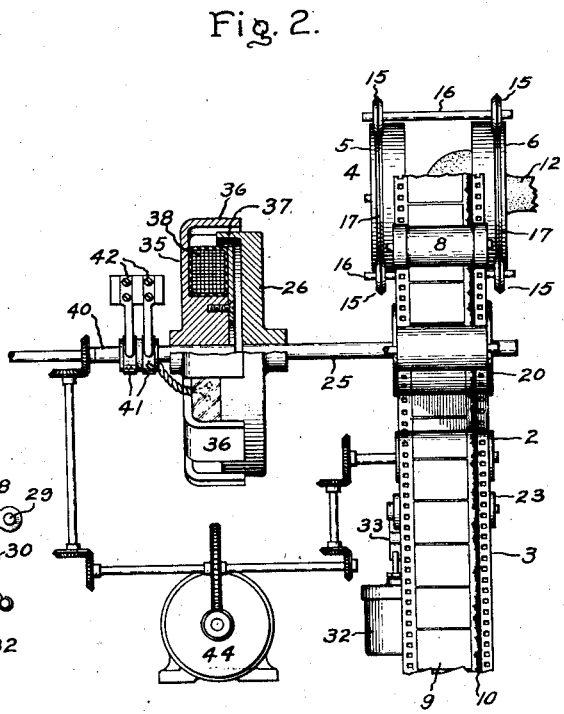
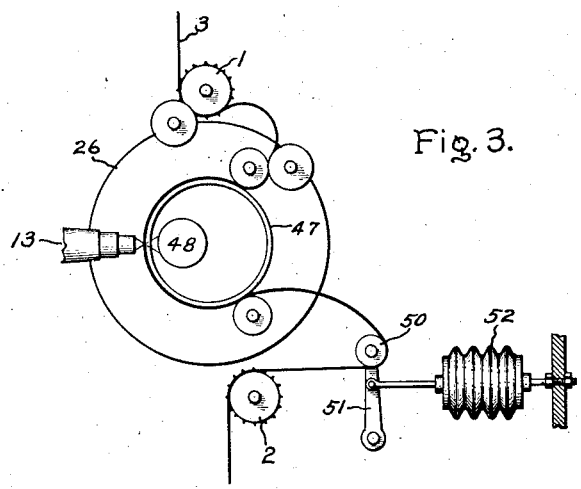
Inventor
Edward W. Kellogg,
by Charles E. Tullar
His Attorney.

Patented Dec. 27, 1932

1,892,554

UNITED STATES PATENT OFFICE

EDWARD W. KELLOGG, OF SCHENECTADY, NEW YORK, ASSIGNOR TO GENERAL ELECTRIC COMPANY, A CORPORATION OF NEW YORK

FILM SUPPORTING AND DRIVING APPARATUS

Application filed July 27, 1928. Serial No. 295,780. REISSUED

My invention relates to film supporting and driving apparatus particularly for the purpose of recording sound photographically on a film and for reproducing sound from a film record. An object of my invention is the provision of apparatus of this character having improved means for supporting the moving film and improved means for moving the film at a substantially uniform speed.

In the past the means for supporting the film at the point where the light is projected on it have been either of the nature of gates or skids in which the film slips over the supporting surface, or of rotating drums. The skids or sliding devices often cut the surface of the film owing to the lodgment of particles of dirt or abrasive matter. A drum is very satisfactory for purposes of making records, but in reproduction, in which the light after passing through the film enters a photoelectric cell, it is obvious that the supporting surface must either be of transparent material or else cut away opposite the sound record part of the film in order to let the light through. The objection to the use of transparent material is that if dirt collects on the surface, it causes an irregular obstruction of part of the light and thereby produces objectionable noise when the recorded sound is reproduced. If an opaque drum is used with part of its cylindrical surface cut away the problem is to provide support for both parts of the drum surface, and at the same time leave room for the photo-cell and its support. In general the cell must be small enough to go entirely inside the drum which is made more difficult by the presence of the shaft within the drum, and be supported through the slot. My present invention provides a supporting means for the film which has the merits of the drum in that there is a rolling rather than a sliding contact with the film and it permits the photo-cell to be placed in the path of the light beam without the difficulty, crowding and awkward support involved in the case of the drum.

My invention also is concerned with the production of uniform motion of the film. The movement of film produced by a sprocket, the sprocket being driven through gears or belts or both from a motor, is not sufficiently steady for satisfactory reproduction of music even though the motor speed be constant. Imperfections in gears and joints in belts cause changes in sprocket speed. It is difficult to obtain a sprocket which is sufficiently free from inaccuracies, and finally even a perfectly formed sprocket running at constant speed would not produce uniform film motion unless the pitch of the film perforations is exactly equal to the sprocket tooth pitch, a condition which is rarely met owing to the varying shrinkage of films. As a means of improving the steadiness of film motion, use has been made of a smooth, cylindrical drum on the shaft of which is a flywheel, the film being held against the drum by one or more pressure rollers. The film is pulled by the sprocket and the tension on that part of the film between the drum and the sprocket causes the drum and flywheel to rotate. This arrangement is helpful but a practical difficulty arises. If a very light flywheel is used, the drum runs easily but the flywheel effect is inadequate. As the size of the flywheel is increased the bearing friction becomes greater and the film tension is increased. The tighter the film, the more forcibly it transmits jerks from the sprocket to the drum and the result is that even the large flywheel undergoes objectionable accelerations, or else the film slips on the drum, either of which defeats the purpose sought.

One method which has been employed to reduce the violence of jerks on the film is to pass the film over a spring-supported roller arranged between the drum and the sprocket. While such an arrangement is advantageous in increasing the flexibility, I have found that under certain conditions another difficulty is encountered, namely that known as "hunting". In accordance with my invention I have provided film driving apparatus including means for increasing flexibility together with means for preventing hunting of the apparatus by the use of damping or energy absorbing means. As an additional means of insuring flexibility I also provide an auxiliary driving means to reduce the tension on the film, which means supplies a part of the torque required to maintain the rotation of the drum.

My invention will be better understood from the following description taken in connection with the accompanying drawing, and its scope will be pointed out in the appended claims.

Referring to the drawing, Figs. 1 and 2 are diagrammatic views taken at right angles to each other illustrating a preferred embodiment of my invention and Fig. 3 is a view similar to Fig. 1 showing a modification.

The apparatus comprising my invention is applicable for use either in the recording of sound on a sensitive film or in the reproducing of sound from a film record. I have chosen to illustrate it, however, as applied to a reproducer.

The main film driving elements of the apparatus are the sprockets 1 and 2, the former drawing the film 3 from a reel or from a picture projector, not shown, as the case may be and feeding it to the supporting means 4. This means comprises the two rings 5 and 6 against which the film is pressed by the rollers 7 and 8 which preferably are rubber faced. The film 3 as shown in Fig. 2 has thereon a picture record 9 and a sound record 10 arranged side by side between the two marginal rows of sprocket holes. While I have shown the rings 5 and 6 spaced apart a distance approximately equal to the combined width of the picture and sound records it is to be understood that they need be spaced only the width of the sound record. Within the rings, or in the present example within ring 6, is the photo-electric cell 12 and opposite the curved portion of the film supported on the rings is the optical system 13 by means of which a very narrow light beam of the order of one mil in width is directed on that part of the film bearing the sound record. This light as modified by the sound record passes on into the cell 12 from which current variations are received corresponding to the sound record. Rings 5 and 6 are mounted for free co-axial rotation by means of the rollers 15 of which I have shown by way of example three arranged at angles of 120 degrees around each ring. I have also shown the corresponding rollers of each ring mounted on a common shaft 16. If desired, a greater number of rollers may be employed and also they may have separate mountings. As an alternative construction the rings may be carried on ball races if desired. As a means of maintaining the rings in proper alinement I have formed each with a V-shaped groove 17 into which fit the correspondingly shaped faces of the rollers. The film is thereby supported at each side of the sound record thereon and there is nothing to interfere with the photo-electric cell or its mounting and connections.

From the supporting rings the film passes successively over the drum 20, fixed rollers 21 and 22, movable idler 23 and sprocket 2 to the receiving reel, not shown, or to other apparatus. Drum 20 is freely rotatable and is shown mounted on the shaft 25 on which also is mounted the disk 26 comprising a flywheel, the mass of which tends to maintain the speed of the film constant. Were the film to be caried directly from the drum to the sprocket 2, a jerk at the sprocket would be transmitted forcibly to the film on the drum either causing the film to slip over the drum or to accelerate the drum and flywheel and an irregularity in speed would thus be communicated to the point of application of the light beam. Accordingly I provide between the sprocket 2 and the drum 20 the idler 23 mounted on the arm 28 pivoted at 29. This idler engages a loop in the film which is given more or less tension by the spring 30 connected to the arm 28. A jerk or momentary speed change at the sprocket now results only in a slight movement of the idler 23 and a very small change in the tension on the film, and the speed of the drum is practically unaffected, nor is there any tendency for the film to slip on the drum. The idler 23 assumes a mean position at which the tension produced by the spring is just sufficient to overcome the frictional resistance of the drum, rings, and rollers. I have found that the arrangement, as so far described, while tending in the main to reduce speed fluctuations, is under certain conditions subject to hunting. For example, suppose that for the moment the drum with its flywheel is running too slowly, the loop engaged by the idler 23 shortens and the tension of the spring 30 is increased. The drum in response to the greater film tension is accelerated and the idler returns to its original position but the drum has acquired a speed greater than normal and accordingly the idler passes beyond its normal position down to a new position where the tension of the spring is below normal. Now the film tension, being below normal, allows the drum to lose speed and again we have the condition with which we started. This process may continue through many cycles, or even indefinitely, especially if any speed variations at the sprocket coincide in frequency of repetition with the frequency at which the system tends to hunt, and while bearing and other friction tends in a slight degree to damp out such oscillations of speed it is entirely inadequate where constant speed is required. It is also true of the system in which the flexibly supported roller 23 is omitted that hunting occurs. The elastic stretch of the film as the tension varies constitutes the elastic element of the oscillatory system. The principal difference is that the addition of the flexibly supported idler or any device which provides increased flexibility, greatly lengthens the period of the hunting and also makes it more evident to the eye since changes of tension are marked by changes in the position of the roller or length of loop. To prevent hunting in apparatus such as I have described, I have provided means for damping out the recurring speed variations. One of these means is the dash pot 32 of the well known liquid type, the movable member of which connects with the arm 28. To permit sudden quick movements of the idler 23, I employ a yielding member such as the spring 33 in the connection between the dash pot and the arm 28. This spring is stiff compared with spring 30 and does not appreciably reduce the effectiveness of the dash pot in preventing hunting.

I have provided an additional arrangement for supplementing the flexibility introduced by the above described movable idler, which comprises carrying the film over the adjacent successive rollers 21 and 22 in the same direction forming a free span therebetween. The natural stiffness of the film causes it to bow up slightly as so arranged, the amount of excess length being decidedly greater than that resulting from the curvature which a film takes when passed in opposite directions over two successive rollers. The bowing up of the film is most noticeable if the rollers are of small diameter. The slight excess length thus introduced in the film is insurance against the transmission of very short and rapid jerks such as may result from tooth action of the sprocket. The unavoidable mass of the idler may make it too sluggish to take up these very rapid jerks on the film, whereas there is practically no inertia to prevent the instantaneous action by the bowed portion of the film between the two rollers 21 and 22.

I have already pointed out the advantages of flexibility in the film coupling through which the sprocket 2 drives the drum 20. For best results it is desirable to carry this flexibility even further than is accomplished by the arrangement as so far described, and the best way to provide additional flexibility is to reduce the film tension needed to drive the drum. With reduced film tension the bow between the rollers 21 and 22 becomes larger and hence more flexible, and a softer spring may be employed at 30. The most satisfactory way of reducing the film tension is to provide an auxiliary drive for the drum and flywheel. The auxiliary drive should be of a type that is smooth in its action and will not fix the speed of the drum, permitting the latter to be determined by the residual tension on the film. In other words, the auxiliary drive must have slip. The ideal auxiliary drive is that which makes use of the drag between a magnet and a sheet of copper or other non-magnetic material of high electrical conductivity, when the latter moves between the poles of the magnet in such a direction that current is induced in it. This method of driving not only has the properties of smoothness and adjustability, but provides additional damping and therefore further insurance against hunting. An auxiliary drive depending on rubbing friction has practically no damping effect to prevent hunting. The fundamental difference is that in rubbing friction the tangential force is practically independent of the relative velocity, whereas the magnetic drag increases with the velocity of the relative movement. Viscous fluid friction is similar in its action to the magnetic drag, but is not so easily applied. The means by which I provide the auxiliary drive will next be described in detail. This means comprises the circular magnet 35 having a series of pole pieces 36 and in the air gap of which rotates an armature comprising the copper flange 37 on the flywheel 26. The magnet is shown as an electromagnet, being provided with the exciting coil 38. Relative rotation of the magnet and armature causes the generation in the latter of eddy currents and a strong magnetic drag. As shown diagrammatically in Fig. 2 I connect the magnet positively with the driving motor and cause it to rotate, the speed being slightly greater than that of the armature. The excess speed of the magnets is preferably of the order of 10 to 20 per cent. Shaft 40 is shown having slip rings 41 connected to the coil 38 and on which slide the brushes 42 connected to a suitable source of direct current. For operation the current is adjusted until the bow in the film between rollers 21 and 22 is from ¼ inch to ½ inch high. The bow or loop in the film between sprocket 1 and roller 7 should be somewhat larger. With this arrangement the film is relieved of a large portion of the tension necessary to rotate the drum and the rings 5 and 6, since a part of the driving power is supplied through the magnet and armature.

I have described several devices whose function is to increase the flexibility of the film between the drum and the sprocket, (1) the flexibly supported idler, (2) the arrangement of rollers so as to cause a bow in the film, and (3) an auxiliary drive of the drum to reduce the tension on the film and thereby augment any loops or bows which its natural stiffness causes it to make. These may be employed either as alternatives or to supplement each other. I have also described two methods of providing damping to prevent hunting, one a device which absorbs energy whenever a loop in the film changes length, and the other a device applied at the flywheel or on the shaft with the drum, which absorbs energy whenever there is an acceleration or retardation of the drum shaft. Any device which applies to the shaft or to something attached thereto a torque which varies with the shaft speed, will provide such damping. Thus electromagnetic drag, and fluid friction are effective damping agents, but not common rubbing friction which gives a tangential force practically independent of speed. It is not essential to the damping that the magnets revolve. Stationary magnets acting on a flange will also produce damping of oscillations, but they will also produce a steady retarding force which it is desirable to avoid, since it increases the tension on the film. The steady retarding force may be avoided by permitting the magnets to revolve at approximately the drum speed, and this may be readily accomplished by so mounting them that they can revolve freely, in which case the electromagnetic drag will itself cause them to assume a speed practically equal to the flywheel speed, and their own inertia will be sufficient to permit the necessary damping forces to act between them and the flywheel. It is obvious that the position of the flywheel and flange may be interchanged with that of the magnets without altering the effectiveness of the arrangement, provided the magnets afford adequate moment of inertia for the drum shaft. The principle of the arrangement just described may be defined in more general terms as follows: In addition to the flywheel or its equivalent which is mounted on the shaft with the drum, a second element is provided which is rotatable about the same axis and is coupled to the drum shaft either by electromagnetic drag or friction, preferably fluid friction. The second element is held at approximately constant speed either by its own inertia or by being positively connected, as for example through gears or a belt to some element which is running at approximately constant speed. Thus a second flywheel, mounted loosely on the same shaft or on a coaxial shaft and coupled to the first flywheel through an energy absorbing coupling, would come under this definition. So also would the employment of a flywheel on the drum shaft, having an annular channel filled with mercury. In this case the mercury is the second rotatable element.

If the second element, which is coupled magnetically or through viscous friction to the drum shaft, rotates at drum speed, it neither appreciably adds to nor subtracts from the torque which must be applied by tension on the film. I prefer however to relieve the film of a large part of the work it has to do in overcoming bearing and roller friction, and I accomplish this by driving the second element (or the magnets in the form of the invention shown in the drawing) at a speed slightly above that of the drum.

Instead of rotating a set of magnets, an equivalent rotating magnetic field may be produced with a stationary magnetic structure, using polyphase alternating current, as is done in the case of an induction motor.

The fundamental principle of my invention consist in the combination of means for increasing the flexibility of the film coupling between the driving sprocket and the drum, with means for damping out hunting. The magnetic drive with the magnets running faster than the drum is a single device which performs both functions, but I prefer to supplement it with the other devices described.

If the apparatus is to be used for recording sound on a sensitive film, a single ring may be used if desired to support the film for its entire width. Also if desired the optical system may be arranged to direct the light beam on the film while it is in engagement with the drum 20 instead of the rings, in which case when the apparatus is used for reproducing purposes the drum would have an opening opposite the sound record and the photo-electric cell would be arranged within the drum.

Such an arrangement is shown in the modified form illustrated by Fig. 3 where the optical system 13 is shown projecting the light beam on a portion of the film supported by the drum 47 which in this case is hollow and contains the photo-electric cell 48. Idler 50 corresponding to idler 23 of the previous form is carried by arm 51 to which connects the air dash pot 52. Since an air dash pot is inherently resilient, a separate spring corresponding to 33 of Fig. 1 is unnecessary.

In the modified form shown in Fig. 3 it will be noted that the bowed portion of the film is formed between the movable idler 50 and one of the two pressure rollers which press the film against the drum.

What I claim as new and desire to secure by Letters Patent of the United States, is:

1. Apparatus for imparting a steady movement to a film comprising a sprocket, a rotatable drum engaged by the film and having a flywheel connected therewith such that the speed of the flywheel depends upon the tension of the film between the drum and the sprocket, means for increasing the flexibility of the film between the drum and the sprocket, and damping means for preventing hunting.

2. Apparatus for imparting a steady movement to a film comprising a film driving member and means for absorbing variations in the tension of the film comprising a pair of adjacent rollers over each of which the film bends in a similar manner and between which the film extends in a free span forming a yielding bowed portion.

3. Apparatus for imparting a steady movement to a film comprising a film driving sprocket and a pair of film engaging rollers arranged on the tension side thereof, the film being bent in a similar manner over each of the rollers and extending in a free span forming a yielding bowed portion therebetween.

4. Apparatus for drawing a film at a uniform speed over a support comprising a film driving member, a resiliently biased idler arranged to engage a loop in the film between the support and the driving member, and anti-hunting means arranged to absorb energy whenever the loop changes length.

5. Apparatus for drawing a film at a uniform speed over a support comprising a sprocket, an idler arranged to engage a loop in the film between the support and the sprocket, a spring operatively engaging the idler to tension the film and a dash pot connected with the idler to prevent hunting.

6. Apparatus for drawing a film at a uniform speed over a support comprising a sprocket, a lever having an idler engaging a loop in the film between the sprocket and the support, a spring engaging the lever for producing the desired tension in the film, a dash pot and a yielding connection between the dash pot and the lever.

7. Apparatus for driving a film at a uniform speed, comprising a sprocket and a drum each engaged by the film, and relatively movable magnet and armature members, one of said members being operatively connected with said drum.

8. Apparatus for driving a film at a uniform speed comprising a sprocket and a drum both engaged by the film, and magnet and armature members each mounted for independent rotation, one of said members being connected with said drum.

9. Apparatus for driving a film at a uniform speed comprising a sprocket and a drum arranged to engage the film serially, cooperating rotatable magnet and armature members, and means for rotating one of said members, the other member being connected with said drum.

10. Apparatus for driving a film at a uniform speed comprising a sprocket and a drum arranged to engage the film serially, the film being arranged to supply a driving torque to the drum, flywheel means rotatable with said drum and means associated with said flywheel for preventing hunting thereof due to the driving effort of the film.

11. Apparatus for driving a film at a uniform speed comprising a sprocket and a drum engaging the film serially, a flywheel operatively connected with the drum and driven by the film and means for applying a torque to the flywheel in the direction of rotation thereof comprising a driving member and a cooperating rotatable magnet and armature connected respectively with the driving member and the flywheel.

12. Apparatus for driving a film at a uniform speed comprising a sprocket and a drum engaged by the film serially, a flywheel operatively connected with the drum and having a flange forming an armature, a rotatable magnet cooperating with said armature and a motor connected to drive said sprocket and said magnet.

13. Apparatus for driving a film at substantially uniform speed comprising a drum and sprocket engaged by the film, a flywheel operatively connected with the drum, and means for preventing hunting, comprising a rotating means coaxial with the flywheel, and so coupled with the flywheel that a torque is applied to the flywheel, the magnitude and direction of the torque depending upon the relative motion of the flywheel and the said rotating means.

14. Apparatus for driving a film at substantially uniform speed comprising a drum and sprocket engaged by the film, a flywheel operatively connected with the drum, and means for applying a torque to the flywheel comprising a rotating coaxial device, so coupled to the flywheel that the torque applied to the flywheel depends upon the relative motion of the flywheel and the said rotating device.

15. Apparatus for driving a film at a uniform speed comprising a sprocket and a drum, a flywheel connected with said drum, means for applying a torque to the drum and for preventing hunting, and means for absorbing variations in the tension of the film between the sprocket and the drum comprising a pair of adjacent rollers over which the film bends in a free span bowed in accordance with the tension of the film.

16. Apparatus for driving a film at a uniform speed comprising a sprocket and a drum each engaging the film, the tension of the film between the sprocket and the drum supplying a portion of the driving torque for the drum and means for preventing hunting of and for supplying additional driving torque to said drum.

17. Film driving apparatus comprising a sprocket and a drum arranged to engage the film serially and means for damping out irregularities in the movement of the film comprising a rotatable magnet member and a cooperating rotatable armature member, one of said members being connected with said drum.

18. Film driving apparatus comprising a sprocket and a drum arranged to engage the film serially and means for damping out irregularities in the movement of the film comprising a rotatable magnet member and a cooperating rotatable armature member, means for rotating one of said members and means for connecting the other member with said drum.

In witness whereof, I have hereunto set my hand this 26th day of July, 1928.

EDWARD W. KELLOGG.